(12) United States Patent
Nakano et al.

(10) Patent No.: US 7,686,718 B2
(45) Date of Patent: Mar. 30, 2010

(54) TIMING CHAIN DRIVE SYSTEM

(75) Inventors: Yoshikazu Nakano, Osaka (JP); Kohei Kunimatsu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 197 days.

(21) Appl. No.: 11/825,546

(22) Filed: Jul. 6, 2007

(65) Prior Publication Data
US 2008/0039253 A1 Feb. 14, 2008

(30) Foreign Application Priority Data
Aug. 9, 2006 (JP) .............................. 2006-216701

(51) Int. Cl.
*F16H 7/08* (2006.01)
(52) U.S. Cl. .................... 474/111; 123/90.31
(58) Field of Classification Search ................. 474/111; 123/90.31; F16H 7/08
See application file for complete search history.

(56) References Cited

U.S. PATENT DOCUMENTS 4,177,689 A * 12/1979 Zeilinger et al. .............. 474/87
4,992,066 A * 2/1991 Watson ......................... 440/75
6,220,211 B1 * 4/2001 Line ......................... 123/90.15
6,322,470 B1 * 11/2001 Markley et al. ............. 474/111

FOREIGN PATENT DOCUMENTS

| DE | 19959521 | 12/1999 |
| DE | 19925268 A1 * | 12/2000 |
| EP | 1101025 | 12/2000 |
| JP | 2003-214504 | 7/2003 |
| KR | 20030049425 | 6/2003 |

* cited by examiner

*Primary Examiner*—Robert A Siconolfi
*Assistant Examiner*—Stephen Bowes
(74) *Attorney, Agent, or Firm*—Howson & Howson LLP

(57) ABSTRACT

In the timing drive of an internal combustion engine, cyclic variations in chain tension, in the span traveling from a camshaft sprocket toward the crankshaft sprocket are leveled by synchronous reciprocating movement of a guide in sliding contact with that span of chain. The maximum rearward speed of the guide coincides approximately with the maximum tension in the span of chain, and the maximum forward speed of the guide coincides approximately with the minimum tension in the chain.

7 Claims, 7 Drawing Sheets

TIMING CHAIN DRIVE SYSTEM

CROSS-REFERENCE TO RELATED APPLICATION

This application claims priority on the basis of Japanese patent application 2006-216701, filed Aug. 9, 2006. The disclosure of Japanese application 2006-216701 is hereby incorporated by reference.

FIELD OF THE INVENTION

This invention relates to a timing drive for an internal combustion engine, and more particular to a chain drive, operated by a crankshaft, for rotating one or more camshafts arranged to operate the engine's intake and exhaust valves. The invention relates more particularly to a timing drive in which the tension in the chain is adjusted by movement of a chain guide.

BACKGROUND OF THE INVENTION

A typical timing chain drive is shown in FIG. 7, which shows schematically a DOHC (dual overhead cam) engine E in which a timing chain CH is driven by a camshaft sprocket S1, and arranged to drive camshaft sprockets S2 and S3. The slack side of the chain, i.e., the side that moves from the crankshaft sprocket S1 toward camshaft sprocket S2, is in sliding engagement with a movable guide Ga, which cooperates with a tensioner T to apply appropriate tension to the chain in order to prevent vibration of the chain. The tension side of the chain, i.e., the side that moves from camshaft sprocket S3 toward the crankshaft sprocket S1, is in sliding engagement with a fixed guide Gb.

The movable guide Ga is pivoted on a pivot pin P attached to the engine block engine, and is biased by the plunger of tensioner T toward the chain. The fixed guide Gb is mounted on the engine block by mounting bolts Q. A typical movable guide of the kind shown in FIG. 7 is described in, and shown in FIG. 11 of, Japanese Laid-Open Patent Publication No. 2003-214504.

In an internal combustion engine timing drive, the torque load on the camshafts varies cyclically, and the torque load variation causes the tension in the tension side of the chain to vary accordingly. Thus, the tension in the chain on the tension side varies cyclically, and the rate of the cyclic variation in tension depends on the speed of rotation of the crankshaft. For example, in a four-cylinder, in-line engine, the tension in the chain goes through four cycles of variation for each full rotation of the camshafts. In the conventional timing drive in which the tension side of the timing chain slides on a fixed guide, the tensile strength of the chain must be sufficient to withstand the peak value of the tension variation in the chain. Because the chain must withstand the peak tension value, the weight of the timing chain is necessarily large, and the requirement for a heavy timing chain leads to a high overall engine size and weight.

An object of this invention is to provide a timing chain drive in which a lighter and more compact chain can be used, and which makes quieter engine operation possible.

SUMMARY OF THE INVENTION

The timing drive according to the invention comprises a crankshaft sprocket on an engine crankshaft, a camshaft sprocket on an engine camshaft, and an endless chain in mesh with the sprockets for transmitting torque from the crankshaft to the camshaft. The chain has a slack side which moves from the crankshaft sprocket toward the camshaft sprocket, and a tension side which moves from the which the camshaft sprocket toward the crankshaft sprocket. A tensioner presses a movable guide against the slack side of the chain. A second guide is slidably engageable with the tension side of the chain and pivoted about a pivot axis for movement approximately perpendicular to the direction of travel of the tension side of the chain. The second guide is movable in a first direction to increase tension in the tension side of the chain and in a second, opposite, direction to decrease tension in the tension side of the chain. A cam, operated by either the camshaft or the crankshaft, is engageable with the second guide and operative to move the second guide in its first direction. The cam is synchronized with the cyclic variations in torque in the camshaft so that the speed of movement of the second guide in its first direction reaches a maximum approximately when the tension in the chain is a minimum, and the speed of movement of the second guide in its second direction reaches a maximum approximately when the tension in the chain is a minimum.

In a first embodiment, the cam is an oval cam coaxial with, and fixed to, the crankshaft, and the second guide includes an arm extending therefrom at a location spaced from the pivot axis and positioned for sliding contact with the oval cam. The oval cam moves the second guide in its first direction twice for each rotation of the crankshaft (and therefore four times for each rotation of the camshaft).

In a second embodiment, the cam is a rectangular cam coaxial with and fixed to the camshaft. The rectangular cam has four lobes, and the second guide has an arm extending from the main part of the guide at a location spaced from the pivot axis, and positioned for sliding contact with the lobes of the rectangular cam. The four-lobed cam moves the second guide cam in its first direction four times for each rotation of the camshaft.

An elastic member can be included for biasing the second guide in its first direction.

In further embodiments, the cam is an oval cam engageable with the second guide at a location remote from the pivot axis, and is driven either by the crankshaft, or by the camshaft, through a train of gears.

The term "approximately perpendicular," when referring to the relationship between direction of movement of the second guide and the path of travel of the tension side of the chain means that the second guide moves in generally transverse relationship to the span of the chain that moves from the camshaft toward the crankshaft, and allows for some departure form exact perpendicularity, including the departure that necessarily results from the fact that the second guide is pivoted.

The term "approximately," when used with reference to the relationship between the speed of movement of the second guide, and the maxima and minima of chain tension, is intended to allow for a reasonable degree of variation from a precise coincidence of maximum speed with maximum or minimum tension. For example, the tension in the chain is approximately at a maximum value over an interval of ±90° from the exact maximum, where the entire cycle of tension variation is a 360° cycle.

It should also be understood that the invention is not limited to an engine having any specific number of intake and exhaust valves. In the case of an in-line four cylinder engine, the tension cycle is such that the chain tension varies sinusoidally, going through four cycles for each full rotation of a camshaft. In this case, there is a 1/4 cycle phase delay between the movement of the guide and the cyclic variation in chain tension. That is, the chain tension reaches a maximum value 1/4 cycle after the second guide is positioned farthest in its first direction, i.e. the direction in which it increases the tension in the chain. As a result, the guide is moving in its second direction at a maximum speed when the chain tension is approximately at its peak. In the case of an in-line six cylinder engine, however, the chain tension reaches a maximum value 1/6 cycle after the second guide is positioned farthest in its first direction.

Because the movement of the pivoted guide on which the tension side of the chain slides is synchronized with the cyclic variations in chain tension, the span length of the tension side of the chain is substantially increased and decreased by the pivoted guide. The maximum span shortening effect is obtained at a moment when the tension of the chain becomes maximum. As a result, a compact, light weight chain, having a relatively low tensile strength can be used and its useful life can be improved. Furthermore, noise due to high chain tension can be reduced, and quieter operation of the timing drive can be achieved.

When the second guide is biased by an elastic member in a direction to increase tension in the chain, at low engine speeds, the guide can be maintained out of contact with the cam, as no reduction in chain tension is needed. On the other hand, the cam becomes operative as the engine speed increases. The use of the elastic biasing member avoids vibration due to pivoting movement of the guide at low engine speeds, and thereby extends the life of the components of the timing drive.

When the cam that moves the pivoted guide is driven though a gear train from the crankshaft or a camshaft, it is unnecessary to provide an extension on the guide for engagement with the cam, and layout problems can be avoided. Moreover, the use of a gear train for driving the cam makes it easy adjust the phase relationship between the movement of the pivoted guide and the cyclic tension variation in the chain, and to select the appropriate drive ratio.

DETAILED DESCRIPTION OF THE PREFERRED EMBODIMENTS

Figure 1:
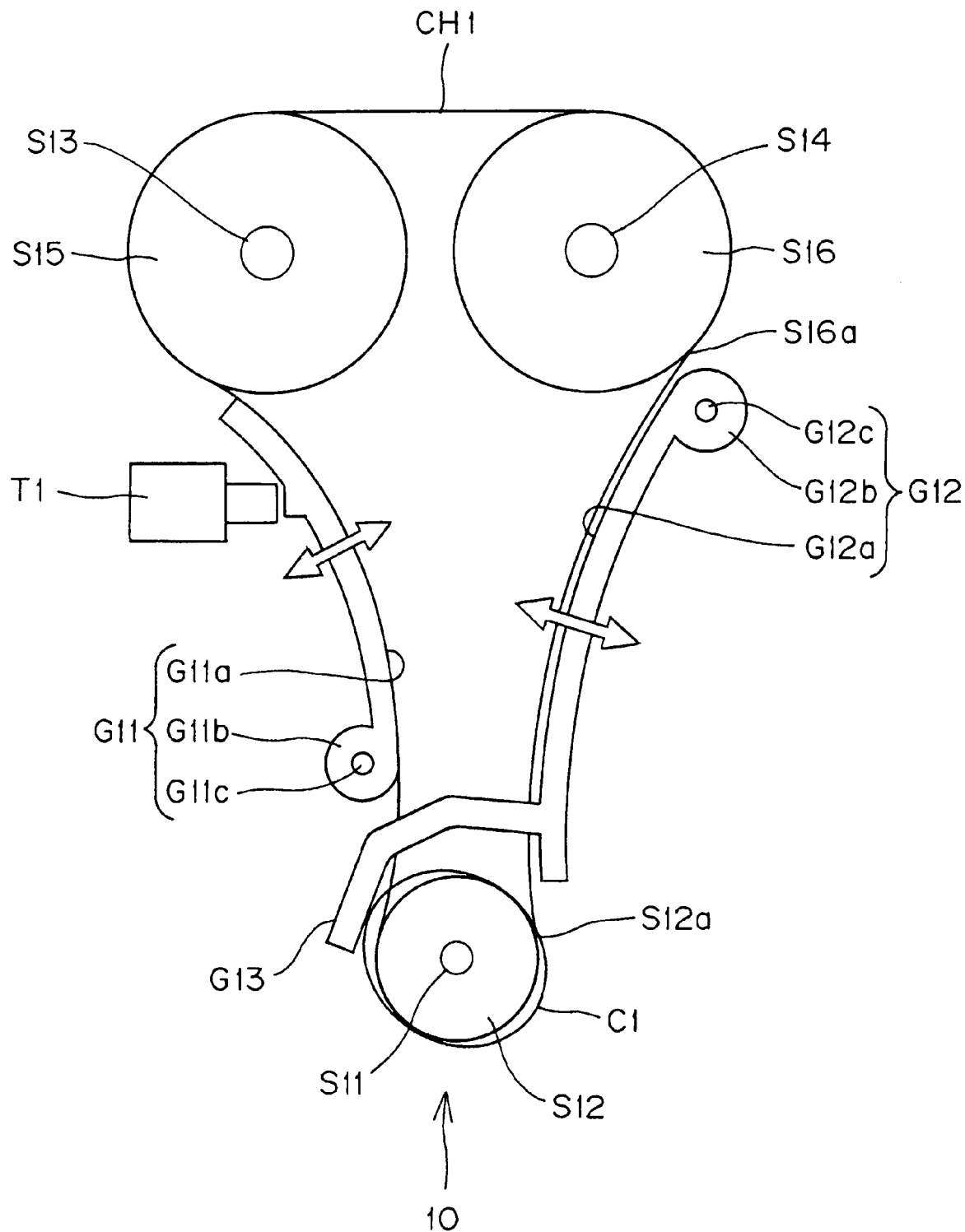
FIG. 1 is a schematic front elevational view of a timing drive according to a first embodiment of the invention.

In the timing chain drive system 10 shown in FIG. 1, a chain CH1 is in mesh with a driving sprocket S12 provided on the crankshaft S11 of an internal combustion engine, and also in mesh with driven sprockets S15 and S16, which are respectively provided on engine camshafts S13 and S14. These camshafts operate the engine's intake and exhaust valves. The timing drive includes tension adjusting means comprising a tensioner T1 and a movable guide G11 in sliding relationship with the slack side of the chain, that is, the side that moves from the crankshaft sprocket S12 toward camshaft sprocket S15. Another guide, G12, is arranged for movement approximately perpendicular to the direction of travel of the tension side of the chain, that is, the side that moves from camshaft sprocket S16 toward crankshaft sprocket S12. The guide G12 is movable in a first direction in which presses against the tension side of the chain, and in an opposite second direction in which it allows the tension side of the chain to loosen. As will be explained, the maximum speed of the pivoted guide G12, when moving in its second direction approximately coincides with the maximum tension in the tension side of the chain. Likewise, the maximum speed of the pivoted guide G12, when moving in its first direction, approximately coincides with the minimum value of tension in the chain.

The movable guide G11 comprises a shoe G11*a*, which comes into sliding contact with chain CH1 to control its path of travel and to apply tension to the chain. The guide G11 is has a boss G11*b* with a mounting hole for receiving a pivot G11*c*, which can be a bolt, a mounting pin or the like. The guide G12 similarly comprises a shoe G12*a*, which comes into sliding contact with the chain CH1 to control the path of travel of the chain and to apply appropriate tension. Guide G12 also has a boss G12*b* with a hole for receiving a pivot G12*c* such as a mounting bolt, a mounting pin or the like.

An oval cam C1 is coaxially fixed to the crankshaft S11, and an arm G13 extends from the main part of the guide G12 at a location remote from the pivot G12*c*. With the arm G13, the pivotable member has the shape of a key. An end portion of the arm G13 comes into sliding contact with the oval cam C1 so that the pivoting of the Guide is synchronized with the cyclic tension variation in the span of chain extending from point S16*a*, where it disengages from sprocket S16, to point S12*a*, where it comes into engagement with sprocket S12. Because points S16*a* and S12*a* move as the guide G12 presses against the chain, the length of the span of chain extending from point S16*a* to point S12*a* varies slightly depending on the position of guide G12, becoming shorter when the guide presses against the chain. The span shortening effect reaches a maximum when the tension in the chain CH1 becomes maximum. The increase or decrease in the span length is actually very small, being typically about 1 mm. The speed of movement of the guide in the direction to decrease tension in the chain coincides approximately with a maximum tension in the cyclic tension variation of the chain. Similarly, the speed of movement of the guide in the direction to increase tension in the chain coincides approximately with a minimum tension in the cyclic variation of tension in the chain.

Figure 2:
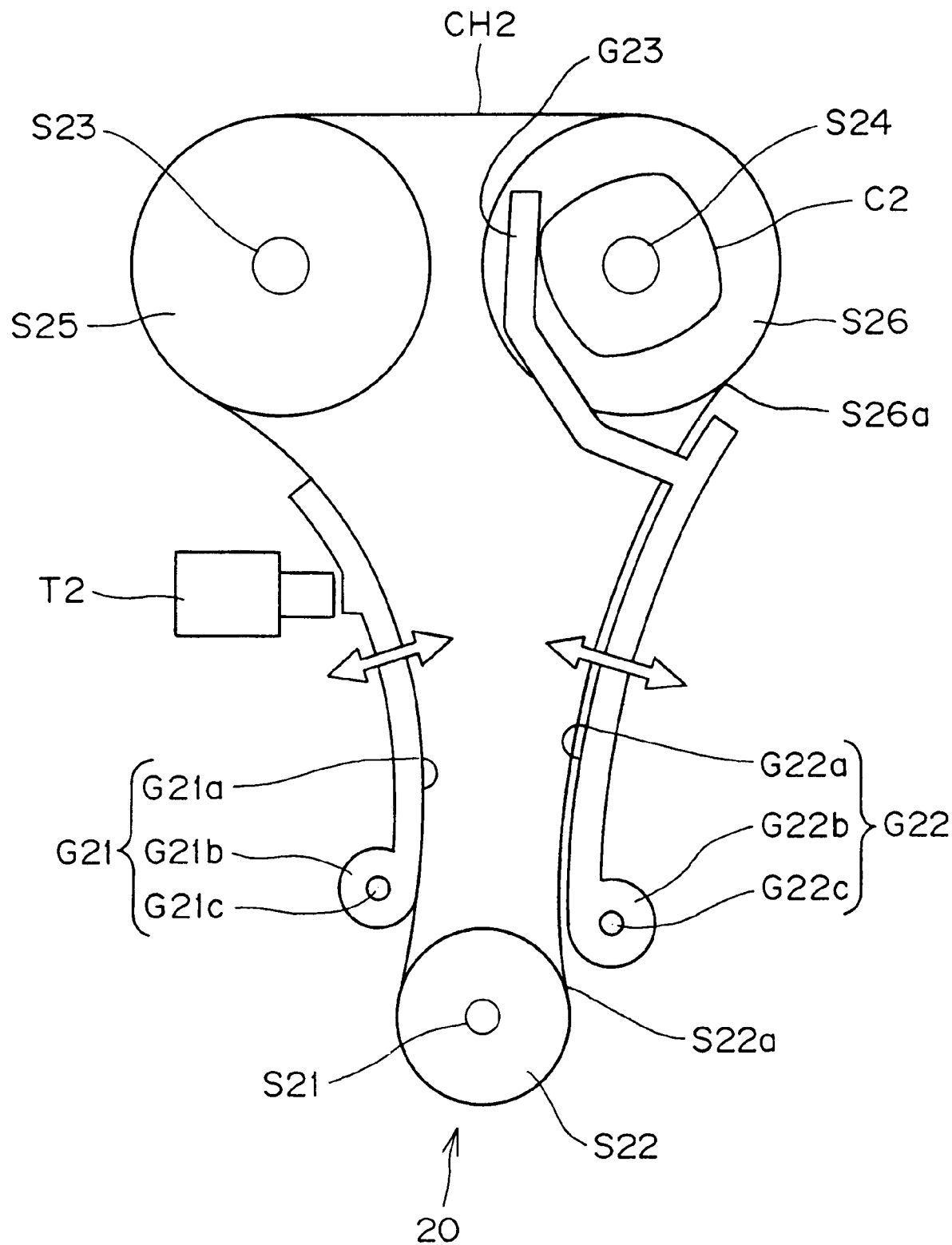
FIG. 2 is a schematic front elevational view of a timing drive according to a second embodiment of the invention.

In the timing chain drive 20 shown in FIG. 2, a chain CH2 is in mesh with a driving sprocket S22 on a crankshaft S21 of an internal combustion engine and with driven sprockets S25 and S26, which are respectively coaxially fixed to camshafts S23 and S24. And the timing chain drive system includes tension adjusting means comprising a tensioner T2 and a movable guide G21 on the slack side of the chain, and a pivoted guide G22 reciprocably movable in a direction approximately perpendicular to the direction of travel of the chain CH2.

Here, as in the previously described embodiment, the pivoting of the guide G22 is synchronized with the cyclic tension variation in the span of chain extending from point S26*a*, where it disengages from sprocket S26, to point S22*a*, where it comes into engagement with sprocket S22. The speed of movement of the guide in the direction to decrease tension in the chain coincides approximately with a maximum tension in the cyclic tension variation of the chain. Similarly, the speed of movement of the guide in the direction to increase tension in the chain coincides approximately with a minimum tension in the cyclic variation of tension in the chain.

The movable guide G21 comprises a shoe G21a, which comes into sliding contact with chain CH2, and is mounted on a pivot G21c which extends through a hole in a boss G21b formed at one end of the guide.

The pivoted guide G22 similarly comprises a shoe G22a, which comes into sliding contact with chain CH2. The guide G22 is pivoted on a pivot G22c which extends though a hole formed in boss G22b at one end of the guide.

In the embodiment shown in FIG. 2, a rectangular cam C2, which has four lobes, is coaxially fixed on camshaft S24, from which the chain moves toward the crankshaft cam S22. The guide is provided with arm G23, which extends from a location on the guide remote from the pivot G22c. The arm G23 is insliding contact with the rectangular cam C2, so that the movement of the pivoted guide G22 is synchronized with the cyclic tension variation in the span of chain moving from sprocket S26 at point S26a and meeting sprocket S22 and point S22a. As in the case of the embodiment of FIG. 1, the maximum span shortening effect is obtained at when the tension in the chain CH2 is at a maximum.

Figure 3:
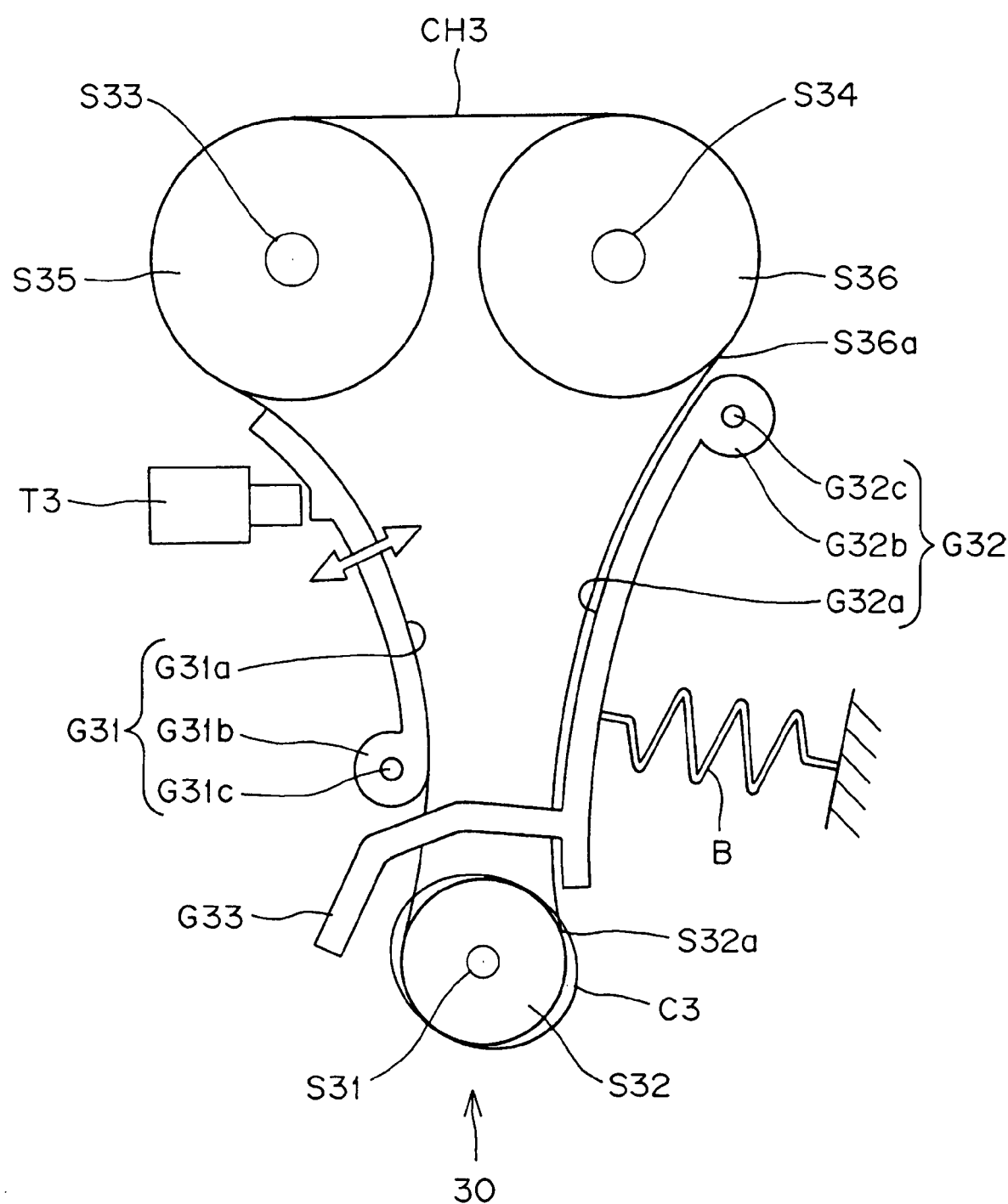
FIG. 3 is a schematic front elevational view of a timing drive according to a third embodiment of the invention.

In the timing chain drive system 30 shown in FIG. 3, a chain CH3 is in mesh with a driving sprocket S32 on a crankshaft S31, and with driven sprockets S35 and S36 provided respectively on camshafts S33 and S34. A tensioner T3 and a movable guide G31 are provided on the slack side of the chain CH3, and a pivoted guide 32, is provided on the tension side of the chain. Here, as in the previously described embodiments, the speed of movement of the guide in the direction to decrease tension in the chain coincides approximately with a maximum tension in the cyclic tension variation of the chain. Similarly, the speed of movement of the guide in the direction to increase tension in the chain coincides approximately with a minimum tension in the cyclic variation of tension in the chain.

The movable guide G31 comprises a shoe G31a, which comes into sliding contact the slack side of the chain. The guide G31 is pivoted on a pivot G31c which extends through a hole in a boss G31b formed at one end of the guide. The pivoted guide G32 also comprises a shoe G32a, which comes into sliding contact with the tension side of chain CH3. The guide is also provided with a boss G32b, having a hole which receives pivot G32c.

As in the first embodiment, an oval cam C3 is coaxially fixed to the crankshaft S31, and an arm G33, engageable by the cam, extends from a location on the guide G32 remote from the pivot G32c. The cam-operated guide exhibits the same span-shortening effect as the guides in the previously described embodiments.

The mechanism of FIG. 3 differs from the mechanism of FIG. 1 in that the pivoted guide G32 is biased against the chain by an elastic member B such as a spring, polyurethane, rubber or the like. When the chain tension is low, at a low engine speed, no reduction of maximum tension is needed. In this embodiment, the arm G33 separates from the cam C3 at low engine speeds, and is not operated by the cam. Consequently, vibration due to pivoting movement of the guide is avoided at lower engine speeds, and an extended useful life of components can be realized.

An elastic member similar to elastic member B can be provided in a timing drive similar to that shown FIG. 2, and the same effects can be obtained.

Figure 4:
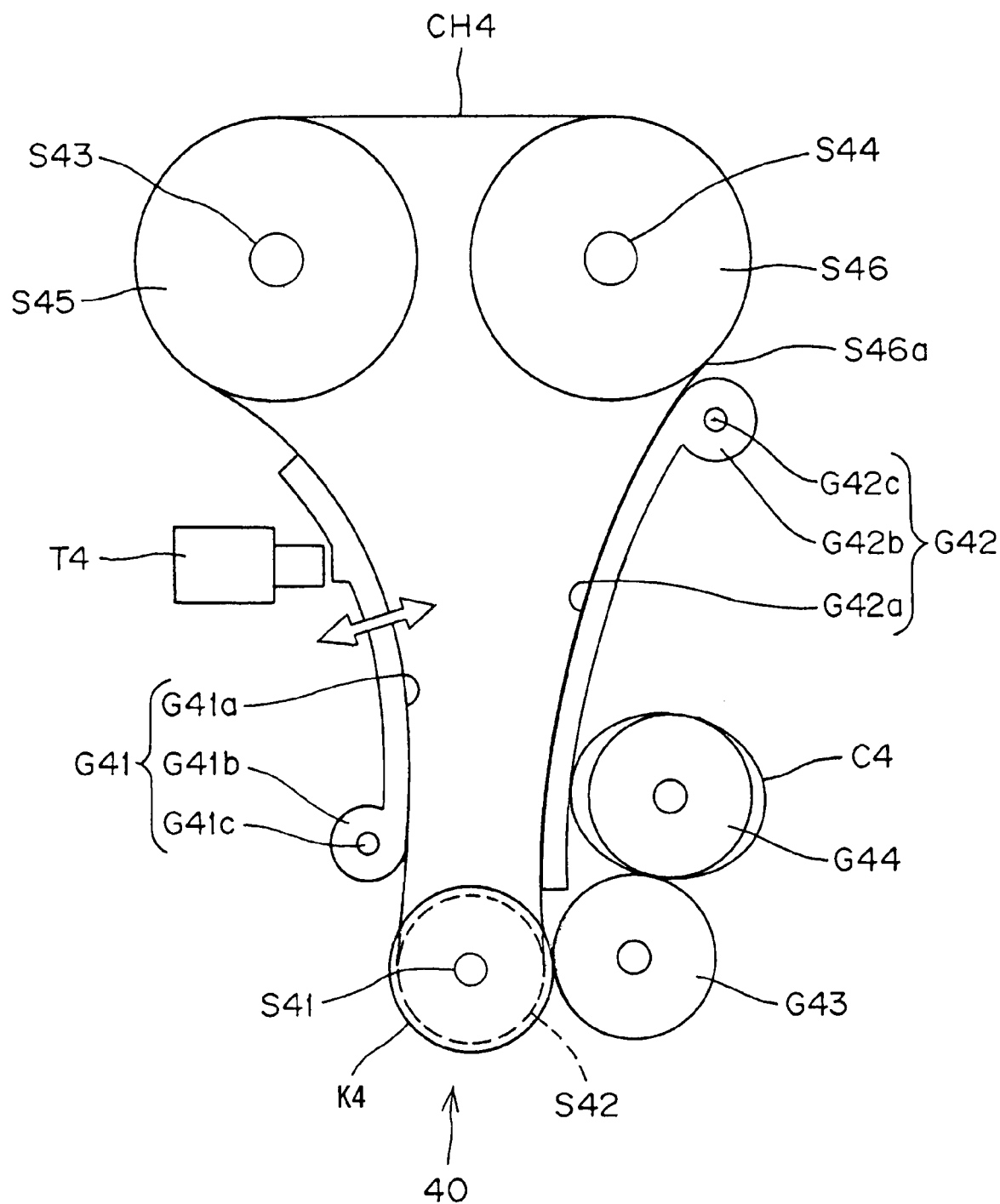
FIG. 4 is a schematic front elevational view of a timing drive according to a fourth embodiment of the invention.

In the timing chain drive system 40 shown in FIG. 4, a chain CH4 is in mesh with a driving sprocket S42, which is located behind a gear K4 provided on crankshaft S41. The chain is also in mesh with driven sprockets S45 and S46, which respectively coaxially fixed to camshafts S43 and S44. A tensioner T4 and a movable guide G41 are provided on the slack side of the chain CH4. A pivoted guide G42, is provided on the tension side of the chain, and as in each of the previously described embodiments, the movement of the pivoted guide G42 is synchronized with the cyclic variation in chain tension, and speed of movement of the guide in the direction to decrease tension in the chain coincides approximately with a maximum tension in the cyclic tension variation of the chain. Similarly, the speed of movement of the guide in the direction to increase tension in the chain coincides approximately with a minimum tension in the cyclic variation of tension in the chain.

The guide G41 comprises a shoe G41a, which comes into sliding contact with the chain CH4 and is pivoted on pivot G41c such as amounting bolt, amounting pin or the like, which extends through a hole in a boss G41b formed at one end of the guide.

Gear K4 on the crankshaft S41 is in mesh with an intermediate gear G43, which, in turn, meshes with a third gear G44 which is coaxially fixed to an oval cam C4. The oval cam comes into sliding contact with the back side of the pivoted guide G42 at a location remote from the pivot G42c. In this case, the guide G42 does not need an extension such as extension G13 in FIG. 1. The use of a gear train to operate the cam, as in FIG. 4, makes it possible to effect reciprocating movement of the pivoted guide in synchronism with the tension variations in the chain even when, because of restricted space, layout of a mechanism having an extension arm on the pivoted guide is difficult or impossible. The mechanism of FIG. 4 has the further advantages that the gear train makes it easy to adjust of the phase relationship between the movement of the guide and the tension variations in the chain, and also easy to adapt the pivoted guide to a variety of engine types by choosing a suitable gear ratio.

Figure 5:
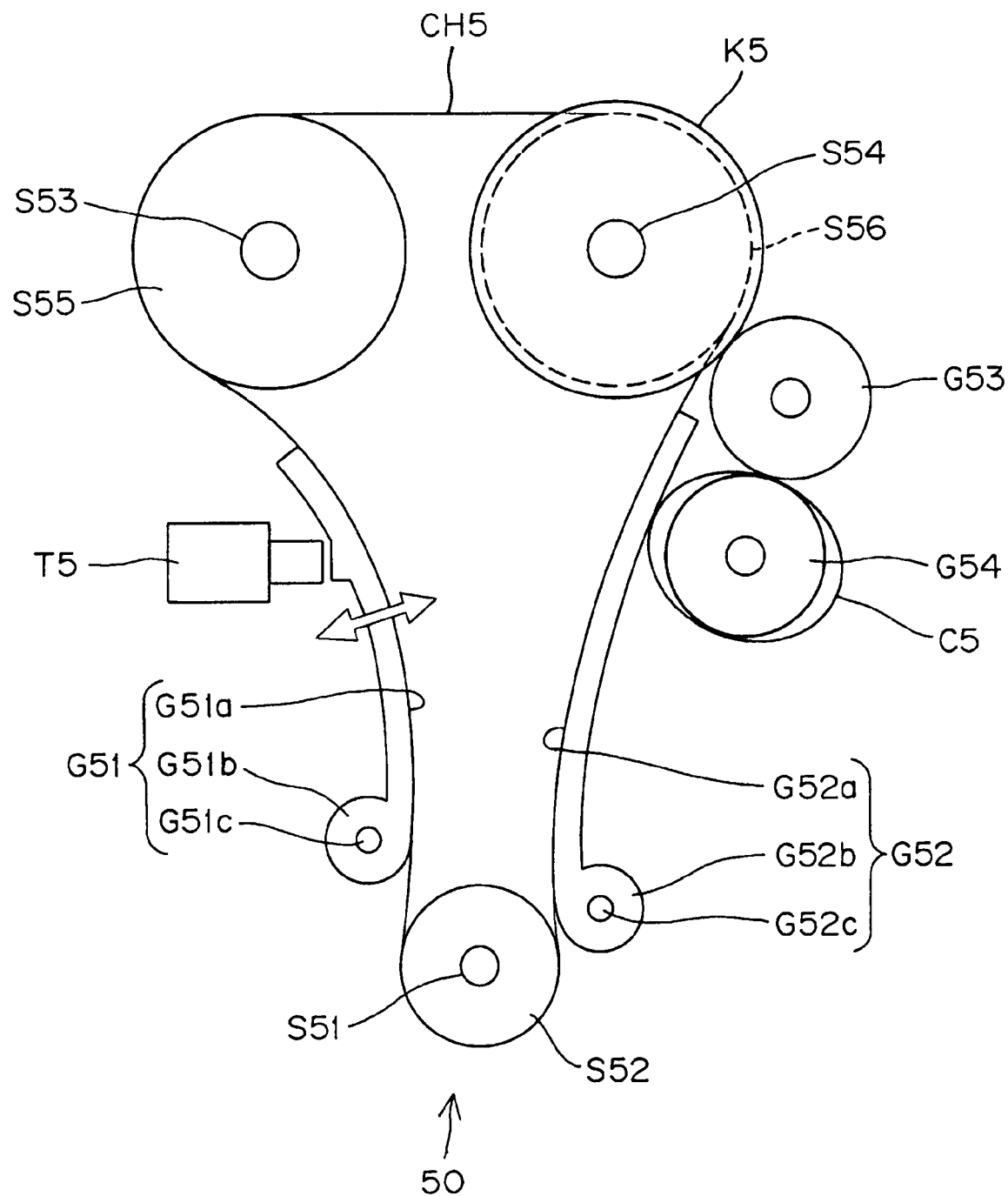
FIG. 5 is a schematic front elevational view of a timing drive according to a fifth embodiment of the invention.
Figure 6:
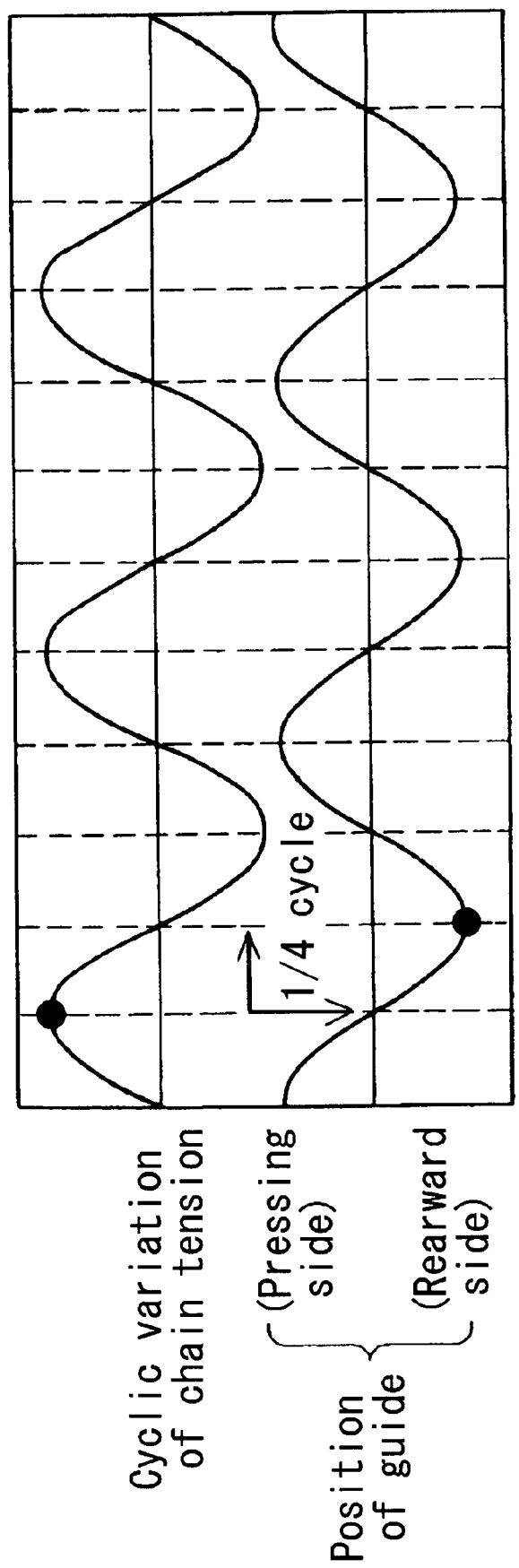
FIG. 6 is a graph showing the cyclic variation of chain tension in an in-line, four cylinder, internal combustion engine.
Figure 7:
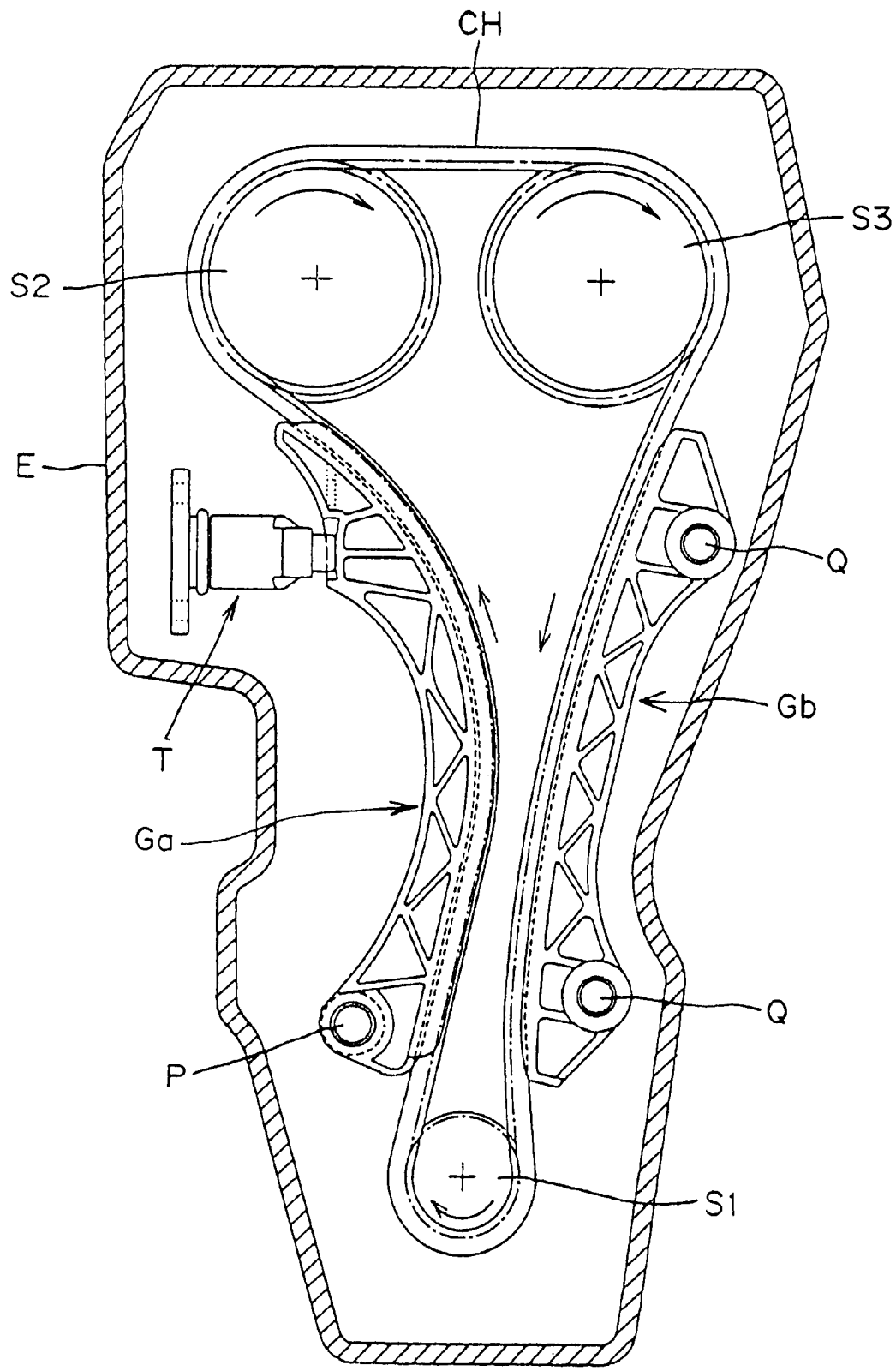
FIG. 7 is a schematic front elevational view of a conventional timing drive.

In the timing chain drive system 50, shown in FIG. 5, a chain CH5 is in mesh with a driving sprocket S52, and also in mesh with driven sprockets S55 and S56, which respectively coaxially fixed to camshafts S53 and S54. Sprocket S56 is located behind a gear K5, which is also fixed on camshaft S54.

A tensioner T5 and a movable guide G51 are provided on the slack side of the chain CH5. A pivoted guide G52, is provided on the tension side of the chain, and as in each of the previously described embodiments, the movement of the pivoted guide G52 is synchronized with the cyclic variation in chain tension, and speed of movement of the guide in the direction to decrease tension in the chain coincides approximately with a maximum tension in the cyclic tension variation of the chain. Similarly, the speed of movement of the guide in the direction to increase tension in the chain coincides approximately with a minimum tension in the cyclic variation of tension in the chain.

The guide G51 comprises a shoe G51a, which comes into sliding contact with the chain CH5 and is pivoted on pivot G51c such as amounting bolt, amounting pin or the like, which extends through a hole in a boss G51b formed at one end of the guide.

Gear K5 on the camshaft S54 is in mesh with an intermediate gear G53, which, in turn, meshes with a third gear G54 which is coaxially fixed to an oval cam C5. The oval cam comes into sliding contact with the back side of the pivoted guide G52 at a location remote form the pivot G52c. In this case, as in the case illustrated in FIG. 4, the guide G52 does not need an extension such as extension G13 in FIG. 1. The use of a gear train to operate the cam, makes it possible to effect reciprocating movement of the pivoted guide in synchronism with the tension variations in the chain even when, because of restricted space, layout of a mechanism having an extension arm on the pivoted guide is difficult or impossible. The mechanism of FIG. 5 has the further advantages that the gear train makes it easy to adjust of the phase relationship between the movement of the guide and the tension variations in the chain, and also easy to adapt the pivoted guide to a variety of engine types by choosing a suitable gear ratio.

In the above described embodiments, suitable components can be made from any of a wide variety of materials. However, since the shoes of the guides come into direct sliding contact with a traveling chain, the shoes are preferably made from polyamide resin or similar engineering plastics, which exhibit excellent wear resistance and lubricity. Suitable shoe materials include nylon 6, nylon 66, all aromatic nylon and the like.

Various kinds of tensioners can be used in the timing transmission of the invention. However, a hydraulic tensioner, in which a plunger is advanced by hydraulic pressure, is preferably used.

Although a timing chain drive system having two camshafts has been described, the invention can be applied to a timing drive having a single camshaft, and also to a timing drives having more than two camshafts, for example timing drives in V-type engines. The principles of the invention are, of course, applicable to engines having any number of cylinders.

Further, although a type of a tensioner, which is one of components in the invention is not particularly limited, a hydraulic tensioner in which a plunger is advanced by hydraulic pressure is preferably used.

INDUSTRIAL APPLICABILITY

By utilizing the crankshaft or an engine camshaft to drive a guide-reciprocating cam, this invention provides a means for leveling the periodic variations in chain tension that occur in an engine timing transmission in such a way that the maximum tension can be decreased, and a lighter, more compact and quieter chain transmission can be realized. The invention provides for manufacturing cost reduction, and improved performance in a timing drive utilizing an chain

We claim:

1. A timing drive in an internal combustion engine having a crankshaft and a valve-operating camshaft, the timing drive comprising;
   a crankshaft sprocket on the crankshaft, a camshaft sprocket on the camshaft, and an endless chain in mesh with said sprockets for transmitting torque from the crankshaft to the camshaft, the chain having a slack side which moves from the crankshaft sprocket toward the camshaft sprocket, and a tension side which moves from the camshaft sprocket toward the crankshaft sprocket, in which the tension in said tension side varies cyclically as a result of cyclic variations in the torque in the camshaft;
   a tensioner;
   a movable guide pressed by said tensioner against said slack side of the chain;
   a second guide slidably engageable with the tension side of the chain and pivoted about a pivot axis for movement approximately perpendicular to the direction of travel of said tension side of the chain in a first direction to increase tension in the tension side of the chain and in a second, opposite, direction to decrease tension in the tension side of the chain; and
   a cam, operated by one of said camshaft and said crankshaft, the cam being engageable with the second guide and configured to move the second guide in said first direction through at least two cycles with each rotation of the crankshaft, and being synchronized with the cyclic variations in torque in the camshaft so that the speed of movement of the second guide in said first direction reaches a maximum approximately when the tension in the chain is a minimum, and the speed of movement of the second guide in the second direction reaches a maximum approximately when the tension in the chain is a minimum.

2. The timing chain drive according to claim 1, in which said cam is an oval cam coaxial with and fixed to said crankshaft, in which said second guide includes an arm extending therefrom at a location spaced from said pivot axis and positioned for sliding contact with said oval cam.

3. The timing chain drive according to claim 2, including an elastic member biasing said second guide in said first direction.

4. The timing chain drive according to claim 1, in which said cam is a rectangular cam coaxial with and fixed to said camshaft, and having four lobes, in which said second guide has an arm extending therefrom at a location spaced from said pivot axis and positioned for sliding contact with the lobes of said rectangular cam, whereby the second guide is moved by said cam in said first direction four times for each rotation of the camshaft.

5. The timing chain drive according to claim 4, including an elastic member biasing said second guide in said first direction.

6. The timing chain drive according to claim 1, in which said cam is an oval cam engageable with said second guide at a location remote from said pivot axis, and being driven by said crankshaft through a train of gears.

7. The timing chain drive according to claim 1, in which said cam is an oval cam engageable with said second guide at a location remote from said pivot axis, and being driven by said camshaft through a train of gears.

* * * * *